(12) United States Patent
Su et al.

(10) Patent No.: US 11,582,529 B2
(45) Date of Patent: Feb. 14, 2023

(54) SATELLITE INTEGRATED RECEIVER DECODER AND CONFLICT DETECTING METHOD

(71) Applicant: NOVATEK Microelectronics Corp., Hsinchu (TW)

(72) Inventors: Guo-Tian Su, Hsinchu County (TW); Chun-Chien Chien, Taoyuan (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 111 days.

(21) Appl. No.: 16/905,882

(22) Filed: Jun. 18, 2020

(65) Prior Publication Data
US 2021/0400358 A1 Dec. 23, 2021

(51) Int. Cl.
*H04N 21/6433* (2011.01)
*H04B 7/185* (2006.01)
*H04N 5/775* (2006.01)
*H04N 21/61* (2011.01)

(52) U.S. Cl.
CPC ..... *H04N 21/6433* (2013.01); *H04B 7/18526* (2013.01); *H04B 7/18586* (2013.01); *H04N 5/7755* (2013.01); *H04N 21/6118* (2013.01); *H04N 21/61* (2013.01)

(58) Field of Classification Search
CPC ............. H04N 21/6433; H04N 5/7755; H04N 21/6118; H04N 21/61; H04B 7/18526; H04B 7/18586
See application file for complete search history.

(56) References Cited

U.S. PATENT DOCUMENTS

| 4,352,183 | A | * | 9/1982 | Davis | .................... H04W 84/08 370/461 |
|---|---|---|---|---|---|
| 6,112,262 | A | * | 8/2000 | Goettsch | ............. G06F 13/4226 710/29 |
| 2007/0250909 | A1 | * | 10/2007 | James | ................ H04N 21/6143 726/4 |
| 2016/0020835 | A1 | * | 1/2016 | Stadelmeier | ...... H04W 72/0473 370/312 |
| 2017/0287040 | A1 | * | 10/2017 | Li | ....................... G06Q 30/0623 |
| 2017/0344500 | A1 | | 11/2017 | Mstowski | |
| 2019/0289243 | A1 | * | 9/2019 | Pretlow | ............ H04N 21/42204 |

FOREIGN PATENT DOCUMENTS

EP 2863560 A1 4/2015

* cited by examiner

*Primary Examiner* — Walter J Divito
*Assistant Examiner* — Anthony Luo
(74) *Attorney, Agent, or Firm* — CKC & Partners Co., LLC

(57) ABSTRACT

A satellite IRD (Integrated Receiver Decoder) complies with DiSEqC protocol and is capable of receiving a program of a specific channel from a single cable interface device through a cable. The DiSEqC transmitter transmits a first command corresponding to the specific channel to the single cable interface device through the I/O interface and the cable. The DiSEqC receiver acquires a second command transmitted on the cable through the I/O interface in response to the DiSEqC transmitter transmitting the first command. The detecting circuit compares the second command with the first command to generate a comparison result. The DiSEqC receiver monitors the I/O interface in response to the comparison result indicating that the first command and the second command are different to determine whether there is a command other than the first command transmitted on the cable.

10 Claims, 3 Drawing Sheets

SATELLITE INTEGRATED RECEIVER DECODER AND CONFLICT DETECTING METHOD

BACKGROUND

Field of Disclosure

The disclosure generally relates to a satellite Integrated Receiver Decoder (IRD) and a related method, and more particularly, to a satellite IRD for handling single cable control signal conflict and a conflict detecting method.

Description of Related Art

The DiSEqC (Digital Satellite Equipment Control) protocol is a satellite protocol often used nowadays and is used in a satellite Integrated Receiver Decoders (IRD), such as a set-up box, which are capable of converting satellite signals to video signals to be played on a television. To more conveniently deploy multiple satellite IRDs which share satellite antenna(s) (e.g., four television embedded with satellite IRDs respectively positioned at different four floors in a building), a single cable interface (SCIF) device, such as Uniable™ switch is also indispensable in single cable distribution. The single cable interface device is located between a satellite antenna and a single cable that connects the multiple satellite IRDs.

However, the single cable interface device is usually coupled to multiple satellite IRDs with a single coaxial cable. When two or more satellite IRDs transmit their commands (such as commands for tuning channels) to the single cable interface device on the coaxial cable at the same time, the signal conflict problem will occur. As a result, the single cable interface device may not be able to receive the commands from respective satellite IRDs correctly, and the users have to resend the command after a few seconds. Accordingly, it is desirable to have a solution for the signal conflict problem.

SUMMARY

One aspect directed towards a satellite IRD complying with DiSEqC (Digital Satellite Equipment Control) protocol capable of receiving a program of a specific channel from a single cable interface device through a cable. The satellite IRD includes an input/output (I/O) interface, a DiSEqC transmitter, a DiSEqC receiver, and a detecting circuit. The satellite IRD connects the cable through the I/O interface. The DiSEqC transmitter is coupled to the I/O interface and configured to transmit a first command corresponding to the specific channel to the single cable interface device through the I/O interface and the cable. The DiSEqC receiver is also coupled to the I/O interface and configured to acquire a second command transmitted on the cable through the I/O interface in response to the DiSEqC transmitter transmitting the first command. The detecting circuit is coupled to the DiSEqC receiver and configured to compare the second command with the first command to generate a comparison result. The DiSEqC receiver is further configured to monitor the I/O interface in response to the comparison result indicating that the first command and the second command are different to determine whether there is a command other than the first command transmitted on the cable.

One aspect directed towards a conflict detecting method which is configured for detecting transmission conflict in a satellite Integrated Receiver Decoder (IRD) complying with DiSEqC (Digital Satellite Equipment Control) protocol capable of receiving a program of a specific channel from a single cable interface device through a cable. The satellite IRD includes an I/O interface, a DiSEqC transmitter, a DiSEqC receiver, and a detecting circuit. The conflict detecting method includes the following steps of transmitting a first command corresponding to the specific channel to the single cable interface device through the I/O interface and the cable; acquiring a second command transmitted on the cable through the I/O interface in response to the DiSEqC transmitter transmitting the first command; comparing the second command with the first command to generate a comparing result by the detecting circuit, and monitoring the I/O interface in response to the comparison result indicating that the first command and the second command are different to determine whether there is a command other than the first command transmitted on the cable.

It is to be understood that both the foregoing general description and the following detailed description are by examples, and are intended to provide further explanation of the disclosure as claimed.

DETAILED DESCRIPTION

Figure 1:
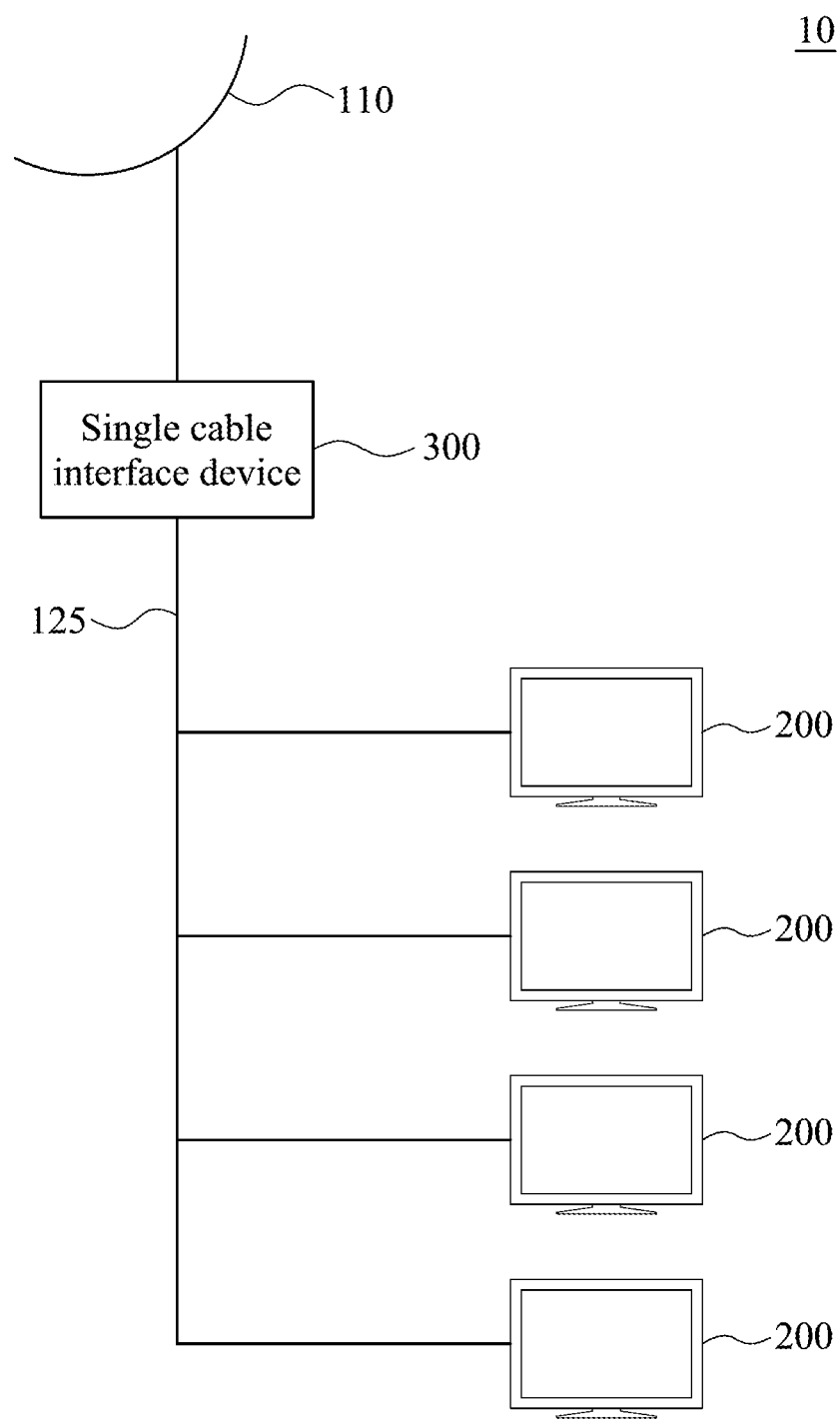
FIG. 1 is a schematic diagram of a satellite signal transmission system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram of a satellite signal transmission system 10. The satellite signal transmission system 10 includes an antenna 110, satellite IRDs 200, and a single cable interface device 300 according to some embodiments of the present disclosure. Each one of the satellite IRD 200 is coupled to the single cable interface device 300 through a cable 125. On the other hand, the single cable interface device 300 receives a satellite video signal (e. g., a TV program) through an antenna 110 and reallocates the satellite signal to the satellite IRDs 200. In some embodiments, each of the satellite IRDs 200 complies with DiSEqC (Digital Satellite Equipment Control) protocol and is capable of receiving the program of a specific channel from the single cable interface device 300 through the cable 125. In some embodiments, the single cable interface device 300 is a Unicable switch. The DiSEqC protocol is a satellite communication protocol between the single cable interface device 300 and the satellite IRDs 200 through the cable 125.

Figure 2:
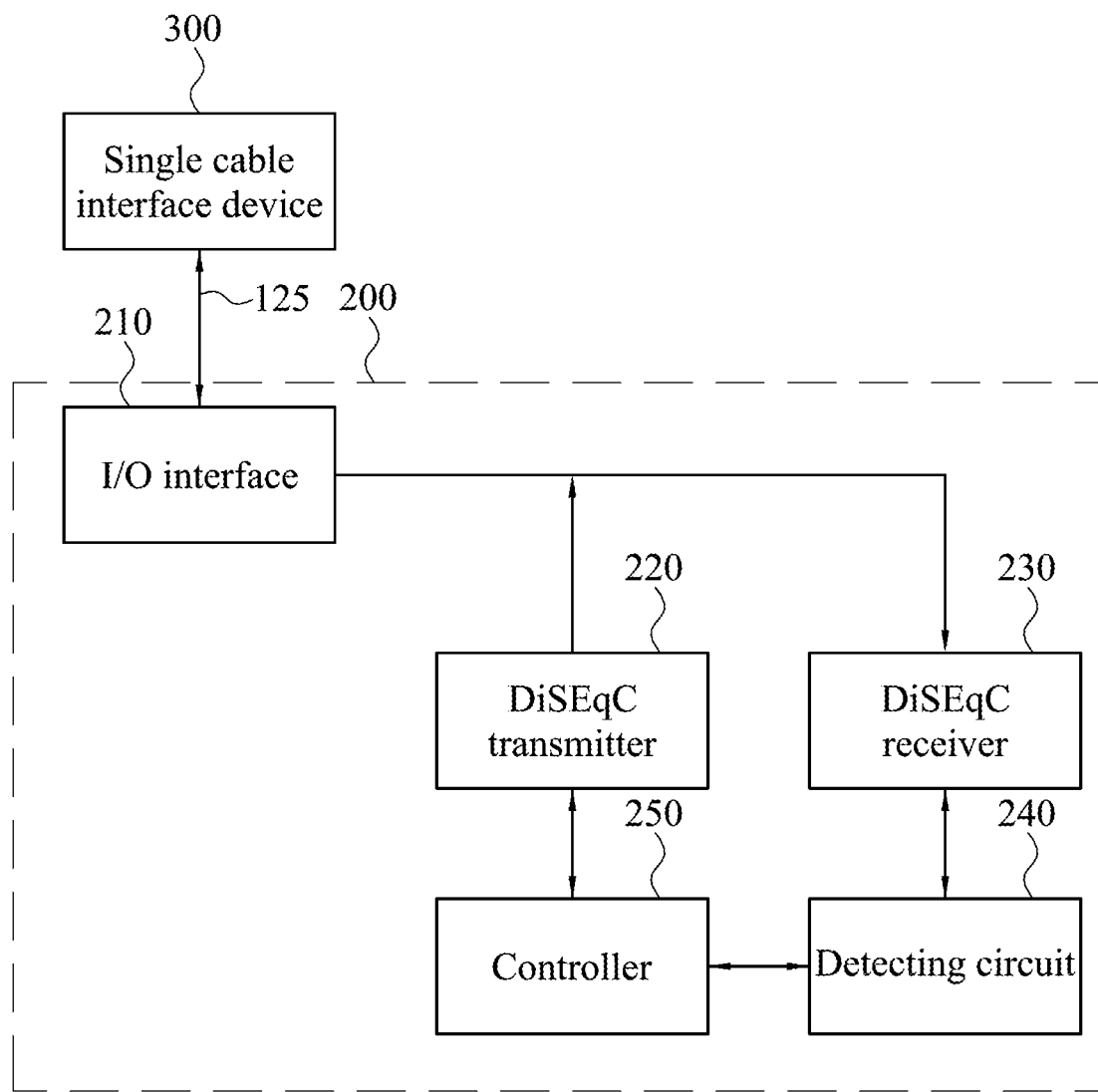
FIG. 2 is a schematic diagram of the satellite IRD and the single cable interface device according to some embodiments of the present disclosure.

Reference is made to FIG. 2, which is a schematic diagram of the satellite IRD 200 and the single cable interface device 300 according to some embodiments of the present disclosure. The satellite IRD 200 includes an input/output (I/O) interface 210, a DiSEqC transmitter 220, a DiSEqC receiver 230, a detecting circuit 240, and a controller 250. The satellite IRD 200 is coupled to the single cable interface device 300 through its I/O interface 210. The I/O interface 210 is coupled to the DiSEqC transmitter 220 and the DiSEqC receiver 230. The DiSEqC receiver 230 is coupled to the detecting circuit 240. The DiSEqC transmitter 220 is coupled to the controller 250. The detecting circuit 240 is coupled to the controller 250.

In some embodiments, the satellite IRD 200 is implemented in television and is regarded as an interface for the television to communicate with the single cable interface device 300. In some other embodiments, the satellite IRD 200 may be implemented in an individual electronic apparatus (such as a set-up box) and is capable of connecting a television such that the television can communicate with the single cable interface device 300.

In some embodiments, the satellite IRD 200 further includes a circuitry of a voltage regulator and a tuner (not shown in FIG. 2). One terminal of the voltage regulator and tuner is coupled to the I/O interface 210 and the other terminal of the tuner is coupled to the DiSEqC transmitter 220 and the DiSEqC receiver 230. The voltage regulator and the tuner is configured to tune the satellite signal. For example, the tuner receives the satellite signal (e.g., the radio waves) from the antenna 125. Because the satellite signal is a high-frequency signal, the tuner will convert the high-frequency signal into a lower-frequency signal.

In some embodiments, the DiSEqC receiver 230 includes a demodulator (not shown in FIG. 2) and a decoder (not shown in FIG. 2). The DiSEqC receiver 230 can perform the analog-to-digital conversion to the analog signal which is received from the tuner to generate digital data and decode the digital data. The DiSEqC transmitter 220 can perform the digital-to-analog conversion on commands or control signals It should be noted that the data processed by the DiSEqC transmitter 220 and the DiSEqC receiver 230 satisfies the requirement of the DiSEqC protocol.

Figure 3:
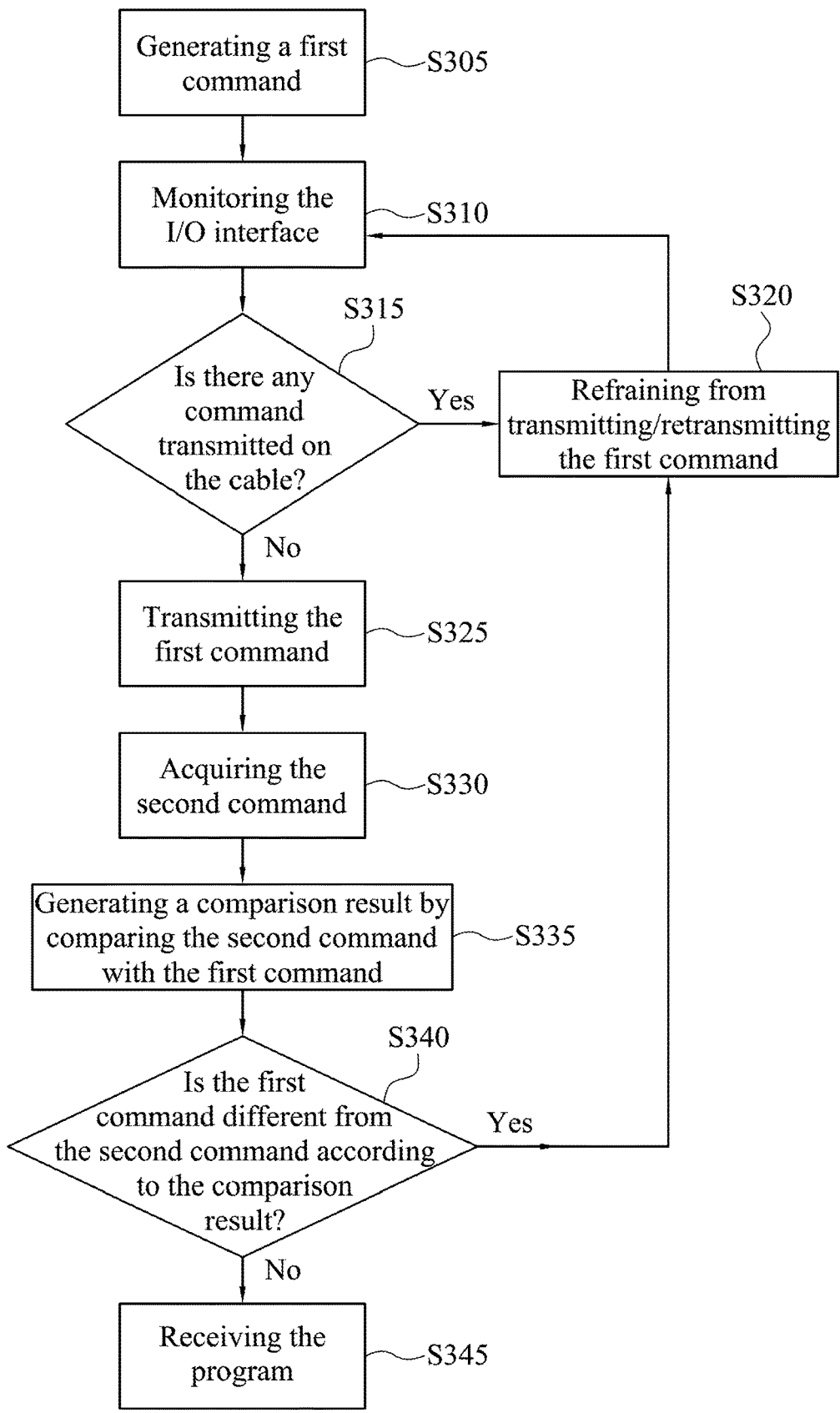
FIG. 3 is a flowchart of a conflict detecting method according to some embodiments of the present disclosure.

For facilitating the understanding of the satellite IRD 200, reference is made to FIG. 2 and FIG. 3. FIG. 3 is a flowchart of a conflict detecting method according to some embodiments of the present disclosure. The conflict detecting method is configured for the satellite IRD 200.

In step S305, the controller 250 is configured to generate the first command corresponding to the specific channel.

In some embodiments, the first command includes identification information of the satellite IRD 200 and frequency information of the specific channel. For example, when a television user wants to change the channel of the television (e.g., by a remote controller or a control panel on the television), the command is generated by the controller 250 of the satellite IRD 200.

In step S310, the DiSEqC receiver 230 is configured to monitor the I/O interface 210 in order to determine (step S315) whether there is any command which is transmitted on the cable 125.

In some embodiments, step S310 is performed before the first command is transmitted by the DiSEqC transmitter 220. In some other embodiments, there can be another circuit to monitor the I/O interface 210, and the circuit for monitoring the I/O interface 210 is not limited to the DiSEqC receiver 230.

Referring to step S315, step S315 is executed to determine whether there is any command transmitted on the cable 125. In some embodiments, when there is any command transmitted on the cable 125, step S320 is performed.

In some embodiments, since the DiSEqC transmitter 220 of the satellite IRD 200 does not transmit the first command, the command received by the DiSEqC receiver 230 is deduced that it is transmitted by another device.

In step S320, the DiSEqC transmitter 220 is configured to refrain from transmitting the first command. Subsequently, step S310 is executed again by the DiSEqC receiver 230 to monitor the I/O interface 210.

Referring again to step S315, when it is determined that there is no command transmitted on the cable 125 in step S315, step S325 is performed.

In step S325, the DiSEqC transmitter 220 is configured to transmit the first command. In some embodiments, the first command is transmitted through the I/O interface 210 and the cable 125 to the single cable interface device 300.

In step S330, the DiSEqC receiver 230 is configured to acquire the second command transmitted on the cable 125 when the DiSEqC transmitter 220 transmits the first command. In some embodiments, the DiSEqC transmitter 220 and the DiSEqC receiver 230 are performed at the same time in step S325 and step S330. Because the second command that the DiSEqC receiver 230 received at the time point in step S330 may be the same as the first command transmitted in step S325 or other signal/noise, the second command may be used as a confirmation in order to determine whether any conflict occurs in the transmission of the first command in step S325.

In step S335, the detecting circuit 240 is configured to generate a comparison result by comparing the first command with the second command.

In some embodiments, the detecting circuit 240 is configured to compare the first command with the second command according to a command format. Because the command format of the first command has to satisfy the DiSEqC protocol, the detecting circuit 240 analyzes the command format of the first command and the second command in order to compare the first command with the second command, and the detecting circuit 240 generates the comparison result.

Referring to step S340, step S340 is executed to determine whether the first command is different from the second command according to the comparison result. In some embodiments, when the second command is different from the first command, which means a command transmission conflict occurs on the cable 125, step S320 is performed. In step S320, the DiSEqC transmitter 220 refrains from transmitting/retransmitting the first command. That is, the DiSEqC transmitter 220 does not retransmit the first command immediately. The DiSEqC receiver 230 continues to monitor the I/O interface 210 in order to determine that if there is any chance for retransmission of the first command.

Referring again to step S340, when it is determined that the second command is the same as the first command, it means that no other satellite IRD transmits its command on the cable 125. That is, the first command is approved to be retransmitted to the single cable interface device 300. Therefore, the single cable interface device 300 may receive the first command carrying information of a selected channel.

In step S345, the satellite IRD 200 receives the program through the single cable interface device 300. Because the first command of the satellite IRD 200 does not conflict with the command from other satellite IRD, it is for sure that the first command is successfully transmitted to the single cable interface device 300 on the cable 125. Therefore, the single cable interface device 300 will respond the correct selected program according to the first command. On the other hand, the first command includes the identification of the satellite IRD 200 and the frequency information of the specific channel, such that the satellite IRD 200 can receive the correct program. Accordingly, television users can watch satellite television programs that they respectively request.

Accordingly, the satellite IRD and the conflict detecting method in the present disclosure can prevent the signal conflict problem and provide the correct satellite program to the television or the electronic device for displaying the program. Furthermore, because the conflict problem is detected at the time point of transmitting the first command, the satellite IRD can solve the conflict problem as fast as possible.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A satellite Integrated Receiver Decoder (IRD) complying with DiSEqC (Digital Satellite Equipment Control) protocol capable of receiving a program of a specific channel from a single cable interface device through a cable, wherein the single cable interface device is coupled between an antenna and the cable, the satellite IRD comprising:
   an input/output (I/O) interface, wherein the satellite IRD connects the cable through the I/O interface;
   a DiSEqC transmitter coupled to the I/O interface and configured to transmit a first command corresponding to the specific channel to the single cable interface device through the I/O interface and the cable;
   a DiSEqC receiver coupled to the I/O interface and configured to acquire a second command transmitted on the cable through the I/O interface in response to transmitting the first command by the DiSEqC transmitter; and
   a detecting circuit coupled to the DiSEqC receiver and configured to compare the second command with the first command to generate a comparison result;
   wherein the DiSEqC receiver is further configured to monitor the I/O interface in response to the comparison result indicating that the first command and the second command are different, so as to determine whether there is a command other than the first command and generated by a device other than the satellite IRD transmitted on the cable after generating the comparison result,
   wherein the DiSEqC transmitter refrains from retransmitting the first command in response to that it is determined that the command other than the first command is transmitted on the cable.

2. The satellite IRD of claim 1, wherein the DiSEqC transmitter retransmits the first command only after it is determined that there is no command other than the first command transmitted on the cable.

3. The satellite IRD of claim 1, wherein the DiSEqC receiver is further configured to monitor the I/O interface prior to the DiSEqC transmitter sending the first command for a first time.

4. The satellite IRD of claim 1, further comprising:
   a controller configured to generate the first command corresponding to the specific channel to be transmitted to the single cable interface device.

5. The satellite IRD of claim 1, wherein the first command comprises identification information of the satellite IRD and frequency information of the specific channel.

6. A conflict detecting method, configured for detecting transmission conflict in a satellite Integrated Receiver Decoder (IRD) complying with DiSEqC (Digital Satellite Equipment Control) protocol capable of receiving a program of a specific channel from a single cable interface device through a cable, wherein the single cable interface device is coupled between an antenna and the cable, wherein the satellite IRD comprises an I/O interface, a DiSEqC transmitter, a DiSEqC receiver, and a detecting circuit, the conflict detecting method comprising:
   transmitting a first command corresponding to the specific channel to the single cable interface device through the I/O interface and the cable;
   acquiring a second command transmitted on the cable through the I/O interface in response to transmitting the first command by the DiSEqC transmitter;
   comparing the second command with the first command to generate a comparison result by the detecting circuit; and
   monitoring the I/O interface in response to the comparison result indicating that the first command and the second command are different, so as to determine whether there is a command other than the first command and generated by a device other than the satellite IRD transmitted on the cable after generating the comparison result,
   refraining from retransmitting the first command by the DiSEqC transmitter in response to that it is determined that the command other than the first command is transmitted on the cable.

7. The conflict detecting method of claim 6, further comprising:
   retransmitting the first command by the DiSEqC transmitter only after it is determined that there is no command other than the first command transmitted on the cable.

8. The conflict detecting method of claim 6, further comprising:
   monitoring the I/O interface by the DiSEqC receiver, prior to the DiSEqC transmitter sending the first command for a first time.

9. The conflict detecting method of claim 6, wherein the satellite IRD further comprises a controller, and the conflict detecting method further comprises:
   generating, by the controller, the first command corresponding to the specific channel to be transmitted to the single cable interface device.

10. The conflict detecting method of claim 6, wherein the first command comprises identification information of the satellite IRD and frequency information of the specific channel.

* * * * *